United States Patent [19]

Hofmann et al.

[11] Patent Number: 4,943,171
[45] Date of Patent: Jul. 24, 1990

[54] WELDED CONNECTION FOR WHEEL BEARING UNIT FOR MOTOR VEHICLES

[75] Inventors: Heinrich Hofmann, Schweinfurt; Manfred Tröster, Bad Kissingen, both of Fed. Rep. of Germany

[73] Assignee: FAG Kugelfischer Georg Schafer (KGaA), Fed. Rep. of Germany

[21] Appl. No.: 461,227

[22] Filed: Jan. 5, 1990

[30] Foreign Application Priority Data

Jan. 25, 1989 [DE] Fed. Rep. of Germany ....... 3902142

[51] Int. Cl.$^5$ .................. F16C 13/00; F16C 43/04; B21K 1/40
[52] U.S. Cl. .................. 384/537; 180/259; 301/124 R; 384/506; 384/543; 464/178
[58] Field of Search ........ 384/449, 499, 502, 504–506, 384/510, 537, 543, 544, 583; 29/149.5 R; 301/111, 124 R; 180/258, 259; 464/178, 906

[56] References Cited

U.S. PATENT DOCUMENTS

| | | | |
|---|---|---|---|
| 3,583,511 | 6/1971 | Asberg | 384/544 |
| 4,150,553 | 4/1979 | Aucktor | 464/906 X |
| 4,240,680 | 12/1980 | Krude et al. | 180/259 X |
| 4,427,085 | 1/1984 | Aucktor | 384/544 X |
| 4,473,129 | 9/1984 | Guimbretiere | 180/259 X |
| 4,493,388 | 1/1985 | Welschof et al. | 180/258 |
| 4,887,917 | 12/1989 | Tröster et al. | 384/543 |

Primary Examiner—Thomas R. Hannon
Attorney, Agent, or Firm—Ostrolenk, Faber, Gerb & Soffen

[57] ABSTRACT

A wheel bearing unit for motor vehicles, and the like, having an outer ring and two rows of anti-friction rolling elements in the outer ring. An axially inward hub has one race for one row of rolling elements. An axially outer part of the of the bearing unit has another row of rolling elements on its periphery. One of the hub or the outer part has an axially projecting pin projecting toward the other. The other of the outer part and the hub has a sleeve with an internal bore into which the pin projects. The periphery of the pin and the interior of the bore are stepped complementary to one another such that when the hub and outer part are brought together, they are stabilized thereby. An axially directed projection projects from the axially forward end of the pin into engagement with the bottom of the bore. When the outer part and hub are relatively rotated, the contact is sufficiently heated to friction weld the end of the axially directed projection to the bottom of the bore. When the bore is in the hub, the hub is provided in the region of its bore with a closed wall or surrounding projection for preventing entrance of undesirable material.

13 Claims, 3 Drawing Sheets

WELDED CONNECTION FOR WHEEL BEARING UNIT FOR MOTOR VEHICLES

BACKGROUND OF THE INVENTION

The present invention relates to a wheel bearing unit for motor vehicles having two rows of rolling elements on two sets of races.

A wheel bearing unit of similar type is disclosed in European Patent Publication No. 46 646. In that case, a single-row wheel bearing is shown in which the axially inner hub part and the axially outer part of the universal joint housing are connected to each other in the following manner. First, upon the bringing together of the parts, mutual centering of the parts is effected by guide sections and welding is then effected in the region of those guide sections. This embodiment has the disadvantage that assembly is first effected and then, in a separate process, welding over the entire circumference in the region of the guide sections must be performed. This method is very time consuming since the welding must be effected by complicated methods, such as electron beam welding or laser welding. Furthermore, the stability of the hub in the region of the weld is poor.

SUMMMARY OF THE INVENTION

The object of the present invention is to improve a wheel bearing unit for a motor vehicle. The wheel bearing unit includes an outer ring. There is at least one and more usually a plurality of rows of antifriction rolling elements, such as ball bearings. There is an axially inner first part, preferably in the form of a wheel hub, having at least one race or a section of a race for the rolling elements. There is an axially outer second part of the bearing unit on which a second inner race or race section is arranged. The outer race covers both of the rows of rolling elements in the separate inner races. The axially inner part and the separate axially outer part are connected to each other by cylindrical guide surfaces and by welding. This structure avoids the above described disadvantages. Its assembly with simultaneous welding of the parts to be connected is effected by very simple means and without radial displacement of the ring parts, and the ring parts are as stable as possible with respect to each other.

The invention concerns the connection between the inner part or hub and the outer part of the combined wheel bearing unit. The axially inner part or hub has an axially outwardly projecting portion with a stepped annular surface. The axially outer part or closure part has an axially inwardly projecting portion thereon with an annular surface which is cooperatingly stepped with steps complementary to the steps on the axially outwardly projecting portion of the hub. When these stepped portions are brought together axially, one is disposed radially inside the other and the complementary steps on the annular surfaces are brought together for providing a stable interconnection between the inner and outer parts. In particular, one of the those axially projecting portions is an axially projecting pin and the other of those portions is a sleeve around the pin, wherein the annular exterior surface of the pin is stepped and the annular interior or bore surface of the sleeve around the pin is correspondingly and matingly stepped. Preferably, there are at least two cooperating stepped sections on each of the two cooperating annular surfaces.

In addition, on one of the stepped portions, and particularly on the one that is the pin inside the surrounding sleeve, there is a further axially forward projection extending toward the other of the inner and outer parts, and particularly the bottom of the bore of the sleeve into which the pin projects. The end of that axially forward projection abuts the other part, and particularly the bottom of the bore in the sleeve, and is welded there by friction welding, which occurs upon relative rotation of the inner part with respect to the outer part. Such relative rotation occurs until a welding temperature is achieved and the weld then forms.

In the embodiment where the hub has the sleeve and has a bore within that sleeve, at least the hub is provided in the region of its bore with a closed wall or a surrounding projection which blocks entrance into the bore of the hub of material from outside the bearing unit.

Because the generally cylindrical, annular guide surfaces of the hub and also of the outer part, which may be a complementary universal joint housing, each includes two stepped sections, the inner and outer parts can be brought relatively close to each other axially before being pushed axially onto each other. Upon the friction welding, the axially forward projection is then pressed against the mating surface. Since one of the inner and outer parts rotates relative to the other, heat is produced at the place of contact. Rotation and consequent heating are continued until the welding temperature is reached. At this stage, increased axial pressure is exerted, the stepped surfaces engage and the connection between the parts is produced with the formation of a weld bead. Upon the displacement under the axial pressure, the parts within the stepped region are centered precisely on each other. Due to the steps, the axial displacement path of the parts is relatively small. Nevertheless, a long cooperating seating surface is obtained. Particularly, in the case of a force fit, this results in a substantial increase of the connection of the parts in addition to the weld connection in the region of the steps. In this way, the stability with respect to tilting moments, which frequently occur in motor vehicles, is also substantially increased During welding, the accessibility to the welding point from the outside is of no importance. This permits the use of a substantially more stable hub part. This is achieved when the hub has a closed wall or a circumferential projection in the bore region. With a closed wall, the entrance of dirt to the place of weld is avoided, where the danger of rusting is greater.

Other features and advantages of the present invention will become apparent from the following description of the invention which refers to the accompanying drawings.

DESCRIPTION OF THE PREFERRED EMBODIMENTS

Figure 1:
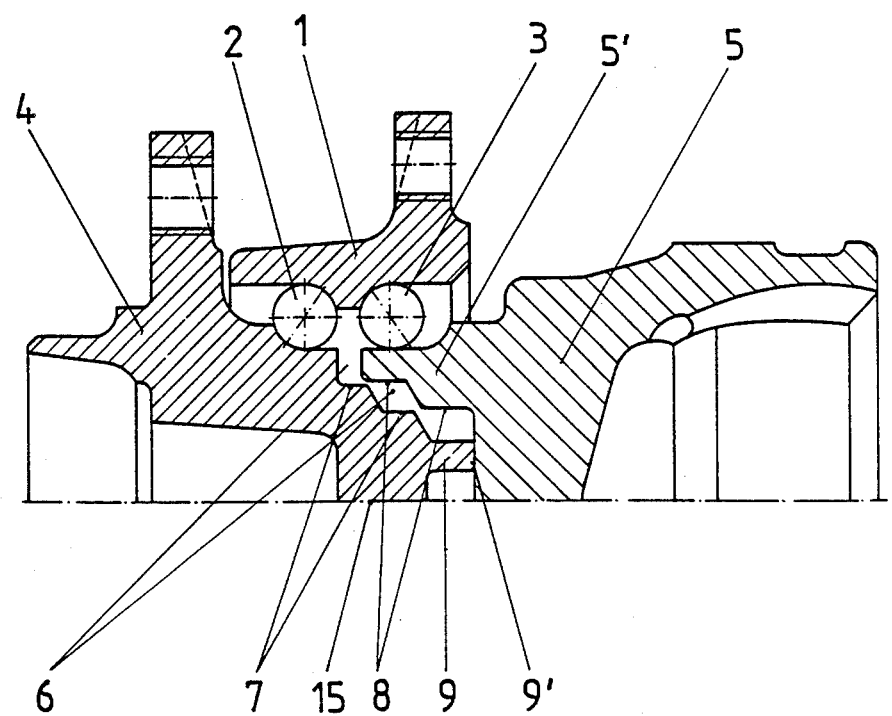
FIG. 1 is a partial cross-section through a first embodiment of a bearing according to the invention, with a universal joint housing, just prior to assembly.

In accordance with FIG. 1, the drivable wheel bearing of a motor vehicle comprises an outer ring 1, two rows of ball bearings 2 and 3 rolling inside the outer ring 1, the axially inner part in the form of a wheel hub 4, and the axially outer part 5 of a universal joint housing. The hub 4 and outer part 5 are shown in FIG. 1 in their positions at the start of the assembly process. The parts 4 and 5 are shown spaced by the axial distances 6 which are present between the axial ends of the radial walls of the below described steps of those parts. The hub has an axle journal or pin portion projecting axially outward. In that cooperating projecting end region there are two cylindrical surface or annular surface stepped sections 7 present on the hub 4. The axially outward end of each step is defined by a radial wall thereof. The steps are of different respective radii, enlarging away from the end of the pin portion.

Opposite the stepped sections 7 on the surface of the hub are two cylindrical surface or annular surface sections 8, which are stepped matingly complementary to the sections 7. The stepped sections 8 are arranged on a sleeve like, axially inward projection or extension 5' of the universal joint housing 5.

An additional annular, axially outwardly directed forward projection 9 is provided on the hub 4. It includes an axial end 9' which is friction welded to the bottom of the bore in the outer part 5 of the bearing unit or perhaps the universal joint housing. The axial length of the projection 9 is greater than the distances 6 between the radially extending, axial ends of the steps so that before the axial ends of the steps abut, the projection 9 abuts the bottom of the bore in the sleeve.

A certain pre-centering of the parts 4 and 5 with respect to each other is effected by the two rows of balls 2 and 3 with the outer ring 1 extending between the rows. Now, for instance, if the part 5 is rotated under a certain axial pressure, then the heat necessary for the friction welding is produced at the axial end 9' of the projection. After a given temperature is reached, the parts 4 and 5 are then pressed axially against each other until the distances 6 between the axial ends of the steps becomes zero, to the position shown in FIG. 2. The resulting pressure caused weld bead 9" can be noted there.

Since the danger of rusting is much greater in the region of the weld bead 9", it is advisable to close this space off. This is done here by the wall 15 arranged in the region of the bore of the hub 4. The wall obviously also increases the stability of the hub 4 in this region.

Figure 2:
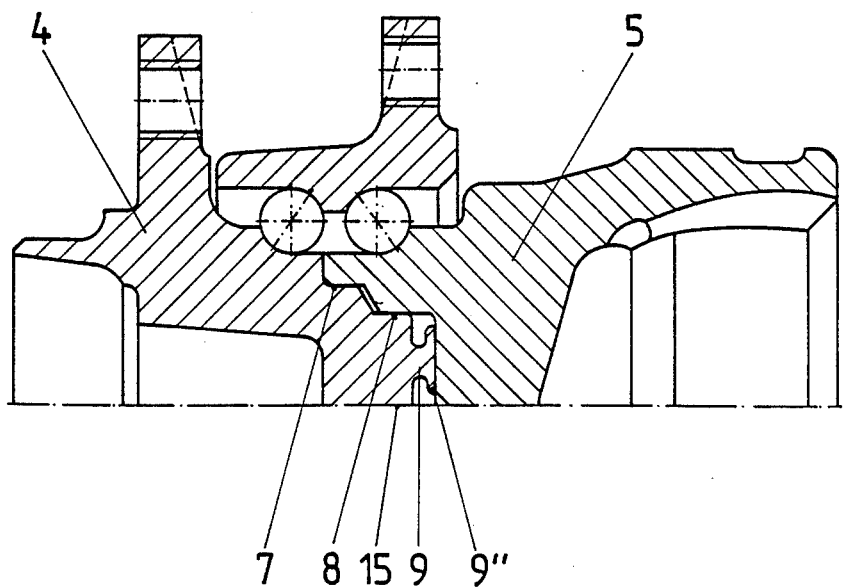
FIG. 2 shows the bearing of FIG. 1 after its assembly.
Figure 3:
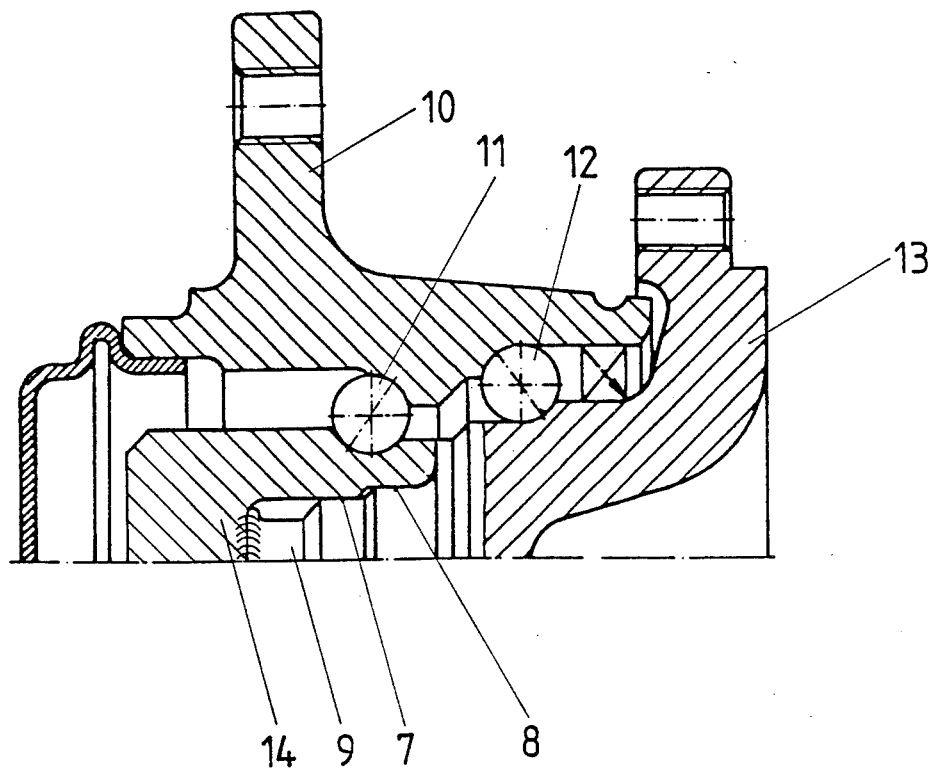
FIG. 3 shows a partial cross-section through a second embodiment of a bearing in accordance with the invention with a flanged axle journal.

FIG. 3 shows a variant of FIG. 2. In particular, the axial projection or pin portion is on the axially outer part 13 and projects axially inward, while the sleeve having a bore with a bottom is defined on the axially inner or closure part 14. In this case, the wheel bearing comprises the outer ring 10, the rows of balls 11 and 12, covered by the one outer ring 10, the flanged axially outer axle journal 13, and the axially inner closure part 14. As in the previous embodiment, the complementary steps 8 in the bore of the closure part 14 are opposite the complementary cylindrical or annular steps 7 on the exterior of the pin 13. The axially outer pin 13 has an axially inwardly directed forward projection 9, the axial end of which is fastened by friction welding to the closure part 14. In the first embodiment, in contrast, the forward projection 9 is on the axially inner part 4 and projects axially outward.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A wheel bearing unit for a motor vehicle, or the like, the bearing unit comprising:

an outer ring having an outer race for rolling elements, at least one row of anti-friction rolling elements for rolling about the race of the outer ring;

an axially more inward inner part; an axially more outward outer part, axially outward of the inner part;

a respective inner race defined on at least one of the inner part and the outer part for cooperating with the outer race on the outer ring and with the rolling elements supported thereby for defining the races for the rolling elements;

one of the inner part and the outer part having an axial projection thereon projecting axially toward the other of the inner part and the outer part, and the axial projection having an annular periphery with a plurality of different radius steps defined on it;

the other of the outer part and the inner part having an axially extending sleeve defined thereon axially extending toward the one of the inner part and the outer part, and the sleeve having an internal bore with a surface which is stepped complementary to the stepped periphery of the axial projection, such that with the outer part and the inner part pressed axially together, the complementary steps come into engagement and orient the inner part and the outer part with respect to each other;

the axial projection having an axially forward end toward the other of the inner part and the outer part; the sleeve bore having a bottom facing toward the axially forward end of the projection;

an axially directed forward projection extending from one of the inner part and the outer part toward the other, located in the bore of the sleeve and extending into engagement with the axial end of the other of the outer part and the inner part, and the axially directed forward projection being welded to the other of the outer part and the inner part in the bore.

2. The wheel bearing unit of claim 1, wherein the axially directed forward projection is long enough that before the complementary steps engage, the axially directed forward projection is of a length to contact the other of the inner part and the outer part for enabling the welding.

3. The wheel bearing unit of claim 1, wherein each of the steps is generally cylindrical in shape, with a radially extending axial end wall between neighboring steps.

4. The wheel bearing unit of claim 1, wherein in the region of the bore inside the sleeve and axially outward of the bottom of the bore, means being defined for closing off access into the bore for preventing entrance of materials therein.

5. The wheel bearing unit of claim 4, wherein the access close off means is defined on the one of the inner part and the outer part on which the axial projection is defined.

6. The wheel bearing unit of claim 1, wherein the axially directed forward projection projects from the axially forward end of the axial projection to engage the bottom of the bore surrounded by the sleeve.

7. The wheel bearing unit of claim 1, wherein there is a first row of anti-friction rolling elements between the outer ring and the inner part and there is a second row of anti-friction rolling elements between the outer ring and the outer part of the bearing unit, and there is a respective inner race on each of the inner part and the outer part for the respective row of rolling elements and there is a respective outer race on the outer ring for each of the rows of rolling elements.

8. The wheel bearing unit of claim 1, within the axial inner part is a hub of a wheel and the axial outer part is a closure over the hub.

9. A wheel bearing unit for a motor vehicle, or the like, the bearing unit comprising:
- an outer ring having an outer race for rolling elements, at least one row of anti-friction rolling elements for rolling about the race of the outer ring;
- an axially more inward inner part; an axially more outward outer part, axially outward of the inner part;
- a respective inner race defined on at least one of the inner part and the outer part for cooperating with the outer race on the outer ring and with the rolling elements supported thereby for defining the races for the rolling elements;
- an axial projection defined on the outer part and extending axially inward for engagement with the inner part, the axial projection having an annular, stepped periphery with a plurality of different radius steps defined on it;
- an axially extending sleeve defined on the axially inner part and extending axially outwardly toward to the outer part, the sleeve having an inner bore with an annular surface which is stepped complementary to the stepped periphery of the axial projection, such that with the outer part and the inner part pressed axially together, the complementary steps come into engagement and orient the inner part and the outer part with respect to each other;
- the axial projection having an axially forward end toward the inner part; the sleeve bore having a bottom facing toward the axially forward end of the axial projection;
- an axially directed forward projection extending from the axial projection and being located in the bore of the sleeve and extending into engagement with the axial end of the inner part, and the axially directed projection being welded to the inner part at the bottom of the bore.

10. The wheel bearing unit of claim 9, wherein the axially directed forward projection is long enough that before the complementary steps engage, the axially directed forward projection is of a length to contact the inner part for enabling the welding.

11. The wheel bearing unit of claim 9, wherein in the region of the bore inside the sleeve and axially outward of the bottom of the bore, means being defined for closing off access into the bore for preventing entrance of materials therein.

12. A wheel bearing unit for a motor vehicle, or the like, the bearing unit comprising:
- an outer ring having an outer race for rolling elements, at least one row of anti-friction rolling elements for rolling about the race of the outer ring;
- an axially more inward inner part; an axially more outward outer part, axially outward of the inner part;
- a respective inner race defined on at least one of the inner part and the outer part for cooperating with the outer race on the outer ring and with the rolling elements supported thereby for defining the races for the rolling elements;
- an axial projection defined on the inner part and extending axially outward for engagement with the outer part, the axial projection having an annular stepped periphery with a plurality of different radius steps defined on it;
- an axially extending sleeve defined on the axially outer part and extending axially inward toward the inner part, the sleeve having an inner bore with an annular surface which is stepped complementary to the stepped periphery of the axial projection, such that with the inner part and the outer part pressed axially together, the complementary steps come into engagement and orient the outer part and the inner part with respect to each other;
- the axial projection having an axially forward end toward the outer part; the sleeve bore having a bottom facing toward the axially forward end of the axial projection;
- an axially directed forward projection extending from the axial projection and being located in the bore of the sleeve and extending into engagement with the axial end of the outer part, and the axially directed projection being welded to the outer part at the bottom of the bore.

13. The wheel bearing unit of claim 12, wherein the axially directed forward projection is long enough that before the complementary steps engage, the axially directed forward projection is of a length to contact the outer part for enabling the welding.

* * * * *